United States Patent
Davies et al.

(10) Patent No.: US 11,848,013 B2
(45) Date of Patent: Dec. 19, 2023

(54) AUTOMATED ASSISTANT INVOCATION OF SECOND INTERACTIVE MODULE USING SUPPLEMENTAL DATA PROVIDED BY FIRST INTERACTIVE MODULE

(71) Applicant: Google LLC, Mountain View, CA (US)

(72) Inventors: Scott Davies, Santa Monica, CA (US); Ruxandra Davies, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 578 days.

(21) Appl. No.: 16/620,868

(22) PCT Filed: Aug. 21, 2018

(86) PCT No.: PCT/US2018/047386
§ 371 (c)(1),
(2) Date: Dec. 9, 2019

(87) PCT Pub. No.: WO2020/040753
PCT Pub. Date: Feb. 27, 2020

(65) Prior Publication Data
US 2020/0342865 A1    Oct. 29, 2020

(51) Int. Cl.
*G10L 15/22* (2006.01)
*G06F 3/16* (2006.01)

(52) U.S. Cl.
CPC .............. *G10L 15/22* (2013.01); *G06F 3/167* (2013.01); *G10L 2015/225* (2013.01)

(58) Field of Classification Search
None
See application file for complete search history.

(56) References Cited

U.S. PATENT DOCUMENTS 9,070,366 B1 *   6/2015   Mathias ................. G10L 15/22
9,218,819 B1 * 12/2015   Stekkelpak ............. G10L 15/07
(Continued)

FOREIGN PATENT DOCUMENTS

EP    2950307 A1    12/2015
EP    3244301 A1    11/2017
(Continued)

OTHER PUBLICATIONS

European Intellectual Property Office; International Search Report and Written Opinion of Ser. No. PCT/US2018/047386; 17 pages; dated Mar. 21, 2019.
(Continued)

*Primary Examiner* — Jonathan C Kim
(74) *Attorney, Agent, or Firm* — Gray Ice Higdon

(57) ABSTRACT

Implementations set forth herein relate to an automated assistant capable of bypassing soliciting a user for supplemental data for completing an action when a previously-queried application is capable of providing the supplemental data. For instance, when a user invokes the automated assistant to complete a first action with a first application, the user may provide many pertinent details. Those details may be useful to a second application that the user may subsequently invoke via the automated assistant for completing a second action. In order to save the user from having to repeat the details to the automated assistant, the automated assistant can interact with the first application in order to obtain any information that may be essential for the second application to complete the second action. The automated assistant can then provide the information to the second application, without soliciting the user for the information.

19 Claims, 9 Drawing Sheets

(56) References Cited

U.S. PATENT DOCUMENTS

| | | | |
|---|---|---|---|
| 9,690,776 B2* | 6/2017 | Sarikaya | G06F 40/30 |
| 9,761,222 B1* | 9/2017 | Scarasso | G10L 15/07 |
| 10,235,996 B2* | 3/2019 | Renard | G06F 3/167 |
| 11,023,513 B2* | 6/2021 | Cheyer | G06F 16/334 |
| 11,126,997 B1* | 9/2021 | Ripple | G06Q 20/341 |
| 11,244,299 B1* | 2/2022 | Pittack | G06Q 20/3224 |
| 2002/0156629 A1* | 10/2002 | Carberry | G10L 15/1822 704/E15.026 |
| 2012/0253788 A1* | 10/2012 | Heck | G06F 40/30 704/9 |
| 2013/0275164 A1* | 10/2013 | Gruber | G10L 17/22 705/5 |
| 2014/0244712 A1* | 8/2014 | Walters | G06Q 30/02 709/202 |
| 2014/0280292 A1* | 9/2014 | Skinder | G06F 16/24534 707/767 |
| 2014/0310002 A1* | 10/2014 | Nitz | G10L 15/22 704/270.1 |
| 2015/0186156 A1* | 7/2015 | Brown | H04L 51/02 715/706 |
| 2015/0293904 A1* | 10/2015 | Roberts | G06N 5/02 704/9 |
| 2016/0035353 A1* | 2/2016 | Chen | G10L 13/08 704/235 |
| 2016/0155443 A1* | 6/2016 | Khan | G06F 3/167 704/275 |
| 2016/0173578 A1* | 6/2016 | Sharma | H04L 51/00 709/203 |
| 2016/0322048 A1* | 11/2016 | Amano | G10L 15/08 |
| 2017/0092270 A1* | 3/2017 | Newendorp | H04N 21/4394 |
| 2017/0132199 A1* | 5/2017 | Vescovi | G06Q 10/06311 |
| 2017/0186429 A1* | 6/2017 | Giuli | G10L 15/22 |
| 2017/0243107 A1* | 8/2017 | Jolley | G06N 5/02 |
| 2017/0269975 A1* | 9/2017 | Wood | G10L 15/1815 |
| 2017/0279747 A1* | 9/2017 | Melzer | G06Q 30/0255 |
| 2017/0300831 A1* | 10/2017 | Gelfenbeyn | G06F 9/54 |
| 2017/0357478 A1* | 12/2017 | Piersol | G06F 3/167 |
| 2017/0357635 A1* | 12/2017 | Mohaideen P | G06F 16/9535 |
| 2018/0025726 A1* | 1/2018 | Gatti de Bayser | G10L 15/22 704/257 |
| 2018/0061420 A1* | 3/2018 | Patil | G10L 15/28 |
| 2018/0075847 A1* | 3/2018 | Lee | G06F 16/24522 |
| 2018/0095963 A1* | 4/2018 | Verma | G06F 16/313 |
| 2018/0096284 A1* | 4/2018 | Stets | G06Q 10/063112 |
| 2018/0096675 A1* | 4/2018 | Nygaard | G10L 13/04 |
| 2018/0137856 A1* | 5/2018 | Gilbert | G06F 3/167 |
| 2018/0190274 A1* | 7/2018 | Kirazci | G10L 15/22 |
| 2018/0293484 A1* | 10/2018 | Wang | G06F 16/632 |
| 2018/0293983 A1* | 10/2018 | Choi | G10L 15/1815 |
| 2019/0114359 A1* | 4/2019 | Yeh | G06F 16/3329 |
| 2019/0164556 A1* | 5/2019 | Weber | G10L 15/26 |
| 2019/0182335 A1* | 6/2019 | Chen | H04L 67/141 |
| 2019/0243899 A1* | 8/2019 | Yi | G06F 16/00 |
| 2019/0294675 A1* | 9/2019 | Sapugay | G06F 40/35 |
| 2019/0347710 A1* | 11/2019 | Polakala | G06Q 30/0239 |
| 2020/0342865 A1* | 10/2020 | Davies | G10L 15/22 |
| 2021/0303798 A1* | 9/2021 | Duong | G06F 40/289 |
| 2021/0304733 A1* | 9/2021 | Jalaluddin | G06F 40/284 |
| 2021/0365482 A1* | 11/2021 | Kim | G06N 20/00 |
| 2022/0188911 A1* | 6/2022 | Gutnik | G06Q 30/0641 |

FOREIGN PATENT DOCUMENTS

| | | | | |
|---|---|---|---|---|
| WO | WO2016054230 A1 | | 4/2016 | |
| WO | WO-2017161139 A1 * | | 9/2017 | G10L 15/22 |

OTHER PUBLICATIONS

European Intellectual Property Office; Summons to attend oral proceedings pursuant to Rule 115(1) EPC issue in Application Ser. No. 18773011.4; 19 pages; dated Oct. 1, 2020.

European Intellectual Property Office; Communication Pursuant to Article 94(3) issue in Application Ser. No. 18773011.4; dated Feb. 21, 2020.

* cited by examiner

AUTOMATED ASSISTANT INVOCATION OF SECOND INTERACTIVE MODULE USING SUPPLEMENTAL DATA PROVIDED BY FIRST INTERACTIVE MODULE

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input.

Some automated assistants allow for a user to control a third party application via the automated assistant using a natural language input to the automated assistant. A user can perform such controls over a wide range of third party applications, thereby expanding a scope of functionality of the automated assistant. However, when sequentially invoking third party applications via the automated assistant, the automated assistant may solicit the user to provide information that the user may have already provided or that may be available via a separate third party application. In response to the automated assistant redundantly soliciting the user for such information, the user may necessarily need to provide the information again, in order to further any action being performed by a particular third party application. When the automated assistant again receives the information, the automated assistant will have to process the natural language input in order to isolate the information for providing to a third party application. Such duplicative interactions can waste computational resources involved in providing natural language outputs to the user, soliciting information, processing the received information, and storing the received information. Furthermore, because speech processing can oftentimes involve communicating with a remote service to perform language processing, network resources can be wasted on processing the same responses from the user.

SUMMARY

Implementations set forth herein are directed to methods, apparatus, and computer-readable media (transitory and non-transitory) for providing an automated assistant that selectively bypasses soliciting a user for supplemental data for completing an action when a previously-utilized interactive module is capable of providing the supplemental data. The supplemental data can be proactively transmitted to the automated assistant by the previously-utilized interactive module, or can be provided responsive to a request from the automated assistant. The action can be one to be completed via a given interactive module, and the previously-utilized interactive module can be one utilized to complete a disparate action. Use of the supplemental data provided by a previously-utilized interactive module can conserve various computational resources. For example, absent various techniques described herein, a user would otherwise have to provide the supplemental data to the automated assistant via duplicative user interface inputs. Such duplicative user interface inputs would need to be processed (e.g., speech-to-text conversion in the case of spoken input, natural language processing, etc.), would need to be transmitted (e.g., to remote component(s) for processing), and/or would prolong a duration of a human/automated assistant dialog. Again, bypassing such duplicative user interface inputs can mitigate consumption of these and/or other computer and/or network resources in completing an action, such as a technical task.

Various implementations set forth herein allow for an automated assistant that is capable of requesting and/or receiving, from one or more sources, supplemental data in furtherance of a requested action—without necessarily soliciting the user for input. For example, in some implementations a user can provide to an automated assistant a first request such as, "Assistant, please reserve flight tickets to California for next Sunday through next Friday." The first request can be embodied as a natural language input in furtherance of a first action of reserving flight tickets. In response to receiving the first request, the automated assistant can select a first interactive module with which to interact with in order to reserve the flight tickets. As part of an interaction between the automated assistant and the first interactive module, the automated assistant can provide the first interactive module with the parameters of "flight" and "next Sunday through next Friday," so that the first interactive module can provide options for departure times and arrival times for each day. The automated assistant can then reserve tickets, on behalf of the user, for a flight that is listed as one of the options.

Following the first request, the user can provide a second request such as, "Assistant, could you also schedule my thermostat to operate conservatively during my trip?" The second request can correspond to a second action of making a thermostat operate more conservatively while the user is away from their home and can be accomplished using a second interactive module that is different than the first interactive module. The second interactive module can operate to interact with the thermostat according to a function that has slots corresponding to time. However, the user did not provide a time in the second request, therefore the second request is void of any content that could be used to fill the slots. Before soliciting the user to provide the time, the automated assistant can solicit the first interactive module to determine whether the first interactive module is capable of providing those parameters for the slots of the function. In some implementations, the automated assistant can initialize a natural language dialog session with the first interactive module in order to determine supplemental data, such as a time at which the user would need to leave their house in order to arrive at the departure airport. In other implementations, supplemental data can be provided by the first interactive module according to a structure or a format that is not exclusively in accordance with a natural language, such as JSON and/or any other format for structured data.

Supplemental data received from the first interactive module can be parsed and/or provided to the second interactive module for use as parameters for filling the slots of the function for scheduling the thermostat. Additionally, or alternatively, the automated assistant can receive the supplemental data, and generate the parameters based on the supplemental data. For example, the supplemental data can indicate the location of the departure airport but not when the user should leave to arrive at the airport. Therefore, the automated assistant can determine the time the user should leave their home for the airport, and therefore a time at which the thermostat should start operating conservatively. A predicted travel time of the user to the airport can be subtracted from the departure time to generate an estimated time at which the thermostat should start operating conservatively, which can be a parameter for a slot used by the function for controlling the thermostat. Similarly, the first interactive module can indicate a location of the airport at which the first interactive module has reserved flight tickets for the user, despite the user not explicitly identifying the exactly address of the airport in the content of the first request. The first interactive module can be configured to generate data identifying the address and/or the estimated time in response to the automated assistant accessing an entry point of the first interactive module for the purpose of obtaining supplemental data. The location and/or estimated time can then be provided, by the automated assistant, to the second interactive module for purposes of satisfying one or more slots of a function for controlling the thermostat.

In some implementations, when less than all parameters necessary for filling slots of a function of the second interactive module are available, the automated assistant can identify any slots that have yet to be assigned parameters and solicit the user for suitable parameters. For example, if the first interactive module is presently unable to provide the automated assistant with the departure time, the automated assistant can respond to the second query with a natural language output such as, "Ok, when would you like the thermostat to start operating conservatively while you're away?" When the time is specified by the user, the automated assistant can provide the time, received from the user, to the second interactive module. The second interactive module can use the multi-source data as parameters for the function to control the thermostat. When each of the first action specified in the first request and the second action in the second request have been completed, a computing device and/or automated assistant interface with which the user is interacting can provide a notification indicating completion of the actions.

In some implementations, prior to submitting a request for supplemental data to a first interactive module, the automated assistant can determine that a second request is associated with a first request for a first action to be performed by the first interactive module. The automated assistant can determine that the second request is associated with the first request based on, for example, the first interactive module being opened when the first request is received by the automated assistant. The first interactive module can be open at a computing device that includes the automated assistant interface that the user is interacting with to provide each request. Additionally, or alternatively, the automated assistant can determine that the first request is associated with the second request based on the user having accessed the first interactive module within a threshold period of time of the user providing the second request. Additionally, or alternatively, the automated assistant can determine that the first request is associated with the second request based on determining that at least some natural language content of the first request is embodied as other natural language content of the second request, either synonymously or in the same terms.

In some implementations, when the user has provided a first request to a first interactive module for performing a first action, and the user provides a second request corresponding to a second action, the automated assistant can choose the second interactive module for completing the second action. For example, the second interactive module can be selected based on suggestions from the first interactive module and/or the automated assistant. The user can be interacting with the first interactive module in order to complete the first action and, during or subsequent to the interaction, the first interactive module can provide a selectable suggestion output for causing a second interactive module to perform a second action. In response to the user selecting the selectable suggestion output (e.g., by tapping a graphical element presented at a graphical user interface, or providing a spoken utterance), the automated assistant can invoke a second interactive module. Additionally, or alternatively, the automated assistant can receive the second request subsequent to the user providing the first request and, in response, solicit the first interactive module for recommendations regarding choosing a second interactive module to fulfill the second request.

In some implementations, a selection of a particular interactive module by the automated assistant can be based on a score assigned to each interactive module according to their relevance to a particular requested action. Therefore, an interactive module with a score that is highest for a particular requested action can be selected by the automated assistant to perform that action. In some implementations, the selection of a particular interactive module can be further based on whether the particular interactive module is associated with an agent module capable of participating in a dialog session with the automated assistant. The dialog session between an agent module and an automated assistant can be a natural language dialog session and/or an exchange of data that is structured according to a protocol that is not exclusively organized according to a particular natural language (e.g., the exchanged data could be transmitted in a JSON format). In some implementations, an interactive module can be associated with, and/or have sub-modules that include, an application module and/or an agent module. An application module can be an application that is installed on a personal computing device of a user and/or otherwise accessible via the personal computing device, and an agent module can be a digital agent capable of participating in a dialog session with the user and/or the automated assistant.

The above description is provided as an overview of some implementations of the present disclosure. Further description of those implementations, and other implementations, are described in more detail below.

In some implementations, a method implemented by one or more processors is set forth as including operations such as receiving, from a user, a first request for an automated assistant to perform a first action, wherein the first request is received at an automated assistant interface of a computing device and the first request includes information with which a first interactive module is to perform the first action. The method can also include causing the automated assistant to provide the first interactive module with the information in order for the first interactive module to complete at least a portion of the first action using the information and to thereby generate supplemental data which includes data that indicates a context associated with the first request or first action. The method can further include causing the first interactive module to complete the portion of the first action; receiving, from the user, a second request for the automated assistant to perform a second action; and providing a supplemental data request to the first interactive module for the supplemental data. The method can also include receiving, from the first interactive module, the supplemental data in response to the first interactive module receiving the supplemental data request; and causing, in response to receiving the supplemental data, the automated assistant to access a second interactive module, wherein accessing the second interactive module includes providing at least the supplemental data to the second interactive module in order for the second interactive module to perform the second action using the supplemental data.

In some implementations, the supplemental data from the first interactive module is received by the automated assistant as a natural language input, which is provided in a same language as the first request from the user to the automated assistant interface. In some implementations, causing the automated assistant to access the second interactive module includes identifying the second interactive module from multiple different interactive modules based on one or more of: whether the received supplemental data is correlated with the second interactive module, whether the second interactive module is currently opened at the computing device, or whether the user has previously selected the second interactive module to perform the second action.

In some implementations, the method can include determining that the first action is associated with the second request based on one or more of: whether the first interactive module is currently opened at the computing device or whether the user has accessed the first interactive module within a threshold period of time from the user providing the second request, wherein the supplemental data request is provided to the first interactive module in response to determining that the first action is associated with the second request. In some implementations, the method can include determining that the first action is associated with the second request by determining that some natural language embodied in the first request is the same as other natural language embodied in the second request, wherein the supplemental data request is provided to the first interactive module in response to determining that the first action is associated with the second request.

In some implementations, the supplemental data includes at least some supplemental information explicitly omitted from any natural language content embodied by the first request and the second request. In some implementations, causing the automated assistant to access a second interactive module includes determining, for multiple interactive modules accessible to the computing device, a score for each interactive module of the multiple interactive modules based on a relevance of each interactive module to a natural language content of the second request or another relevance of each interactive module to the supplemental data.

In other implementations, a method implemented by one or more processors is set forth as including operations such as determining that a first request for a first action to be performed by a first interactive module was received by a computing device, wherein the first interactive module is accessible to an automated assistant, which is configured to be responsive to natural language input from the user. The method can also include causing, in response to determining that the first request was received by the computing device, the first interactive module to initialize performance of the first action using information that is accessible to the first interactive module and to thereby generate supplemental data. The method can also include determining, subsequent to causing the first interactive module to initialize performance of the first action, that the computing device received a second request for a second action to be performed. The method can further include providing, in response to determining that the computing device received the second request, a supplemental data request to the first interactive module, the supplemental data request configured to solicit the first interactive module for supplemental data in furtherance of completing the second action. The method can also include receiving, from the first interactive module in response to providing the supplemental data request to the first interactive module, supplemental data, and providing, in response to receiving the supplemental data from the first interactive module, other information to a second interactive module, wherein the other information includes content that is at least partially based on the supplemental data and is provided to the second interactive module in furtherance of completion of the second action. The method can further include causing user interface output to be rendered at the computing device, wherein the user interface output is based on output provided by the second interactive module, and wherein the second interactive module generates the output based at least in part on the supplemental data provided to the second interactive model.

In some implementations, the method can include causing, at least based on the first request, a selectable suggestion output to be provided at the computing device, the selectable suggestion identifying the second action or the second request; and identifying, from multiple interactive modules accessible to the computing device, the second interactive module based on a relevance of the second interactive module to content of the second request, wherein the supplemental data request is based on a slot of a function associated with the second interactive module, and wherein the supplemental data request at least partially embodies natural language content.

In some implementations, the method can include identifying a function of the second interactive module based on a correlation between the second request and the function; and determining that the first request and the second request are void of a parameter for a slot of the function, wherein the supplemental data request is provided to the first interactive module in response to determining that the first request and the second request are void of the parameter for the slot of the function. In some implementations, the supplemental data received from the first interactive module includes an input parameter for the slot of the function, and the content provided to the second interactive module embodies the input parameter. In some implementations, the method can include generating the other information for providing to the second interactive module using the input parameter from the supplemental data and an additional parameter derived from the first request or the second request for a different slot of the function. In some implementations, the method can include determining that the first request, the second request, and the supplemental data are void of another parameter for another slot of the function; and generating a natural language output for the user from the automated assistant, wherein the natural language output solicits the user to provide the other parameter for the other slot of the function; and receiving, by the automated assistant and from the user, a natural language response that embodies the other parameter for the other slot of the function, wherein the other information provided to the second interactive module embodies the other parameter.

In yet other implementations, a method implemented by one or more processors is set forth as including operations such as receiving, by an automated assistant and from a user, a first request for a first action to be performed via the automated assistant, wherein the first request corresponds to a first interactive module that is accessible to the automated assistant at a computing device, and the first interactive module is configured to be responsive to natural language input from the user and the automated assistant. The method can further include providing, in response to receiving the first request and in furtherance of completing the first action, the first interactive module with information embodied by the first request from the user. The method can also include receiving, by the automated assistant and from the user, a second request for a second action to be performed via the automated assistant, wherein the second action is different from the first action. The method can further include causing, based on receiving the second request, the automated assistant to participate in an interaction between the automated assistant and the first interactive module to solicit the first interactive module for supplemental data in furtherance of completing the second action. The method can also include, when the supplemental data is provided by the first interactive module during the interaction between the automated assistant and the first interactive module: receiving the supplemental data from the first interactive module. The method can further include, when the first interactive module is presently unable to provide the supplemental data at least in furtherance of completing the second action: providing an information request to the user soliciting information in furtherance of completing the second action, and receiving information from the user in response to the user receiving the information request. The method can also include providing, in response to receiving the supplemental data from the first interactive module or the information from the user, an input to a second interactive module, wherein the input is at least partially based on the supplemental data or the information, and is provided in furtherance of completing the second action.

In some implementations, the interaction between the automated assistant and the first interactive module is a natural language dialog session comprising at least one natural language output provided by each of the automated assistant and the first interactive module. In some implementations, the supplemental data or the information includes at least some supplemental information explicitly omitted from any natural language content embodied by the first request and the second request.

In some implementations, the method can include identifying, in response to receiving the second request, a function capable of being performed by one or more interactive modules in furtherance of performing the second action, wherein the one or more interactive modules include the second interactive module; and determining that the first request and the second request are void of a parameter for a slot of the function, wherein a supplemental data request is provided to the first interactive module in response to determining that the first request and the second request are void of the parameter for the slot of the function. In some implementations, determining that the first request and the second request are void of the parameter for the slot of the function includes comparing contents of the first request and the second request to one or more slots of the function.

In some implementations, the method can include causing, in response to receiving the second request, a graphical user interface of the computing device to provide one or more selectable suggestion elements identifying the one or more interactive modules, respectively, as capable of furthering completion of the second action, wherein the input is provided to the second interactive module further in response to the user selecting a selectable suggestion element of the one or more selectable suggestion elements. In some implementations, providing the indication to the user includes causing a separate graphical user interface to present the indication to the user, wherein the selectable suggestion element corresponds to the graphical user interface, which corresponds to the first interactive module, and the indication is presented at the separate graphical user interface, which corresponds to the automated assistant.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
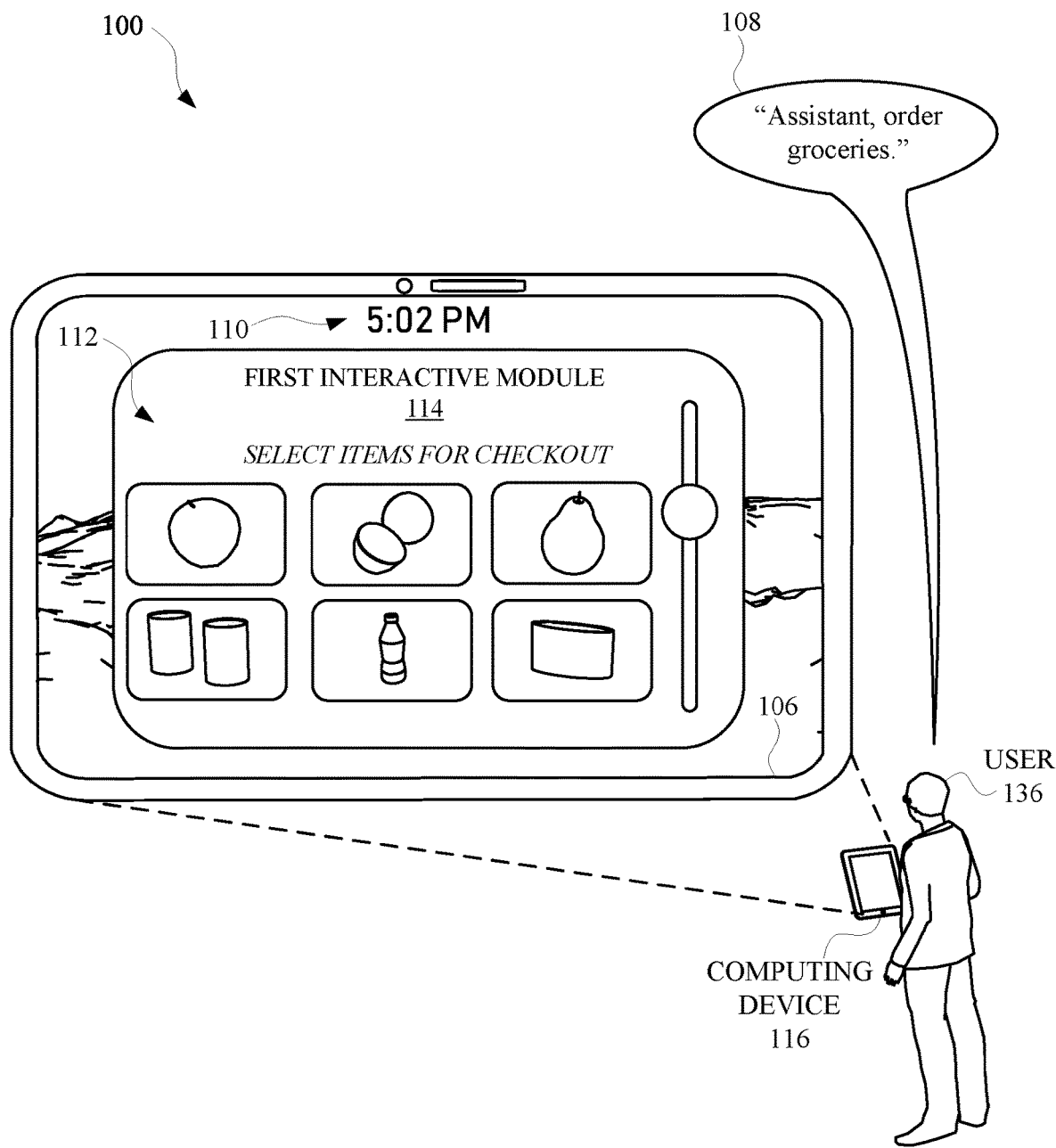
FIGS. 1A, 1B, and 1C illustrate examples of a user interacting with an automated assistant capable of bypassing soliciting particular information from the user, when a separate interactive module is capable of providing the information.
Figure 1B:
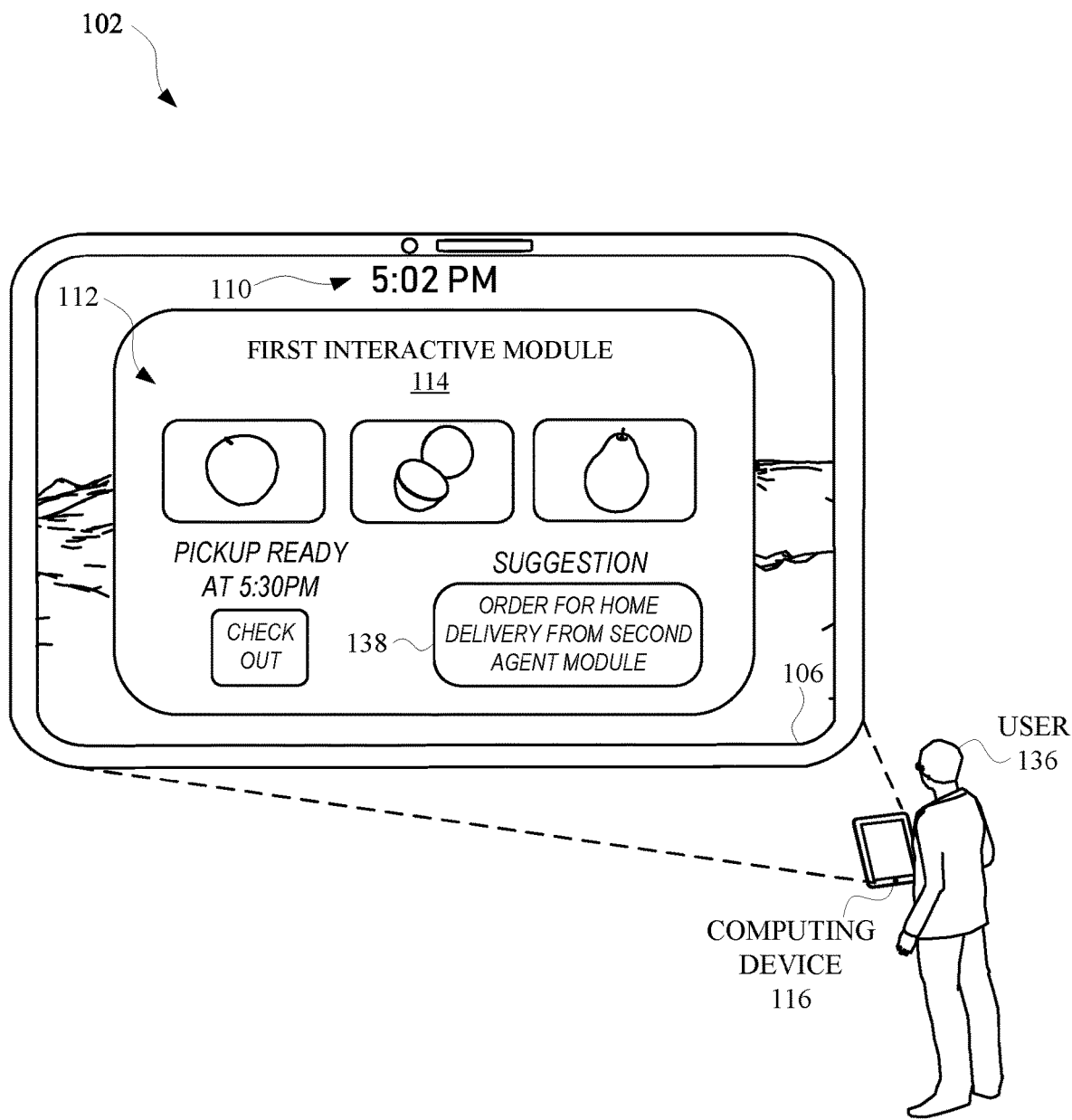
Figure 1C:
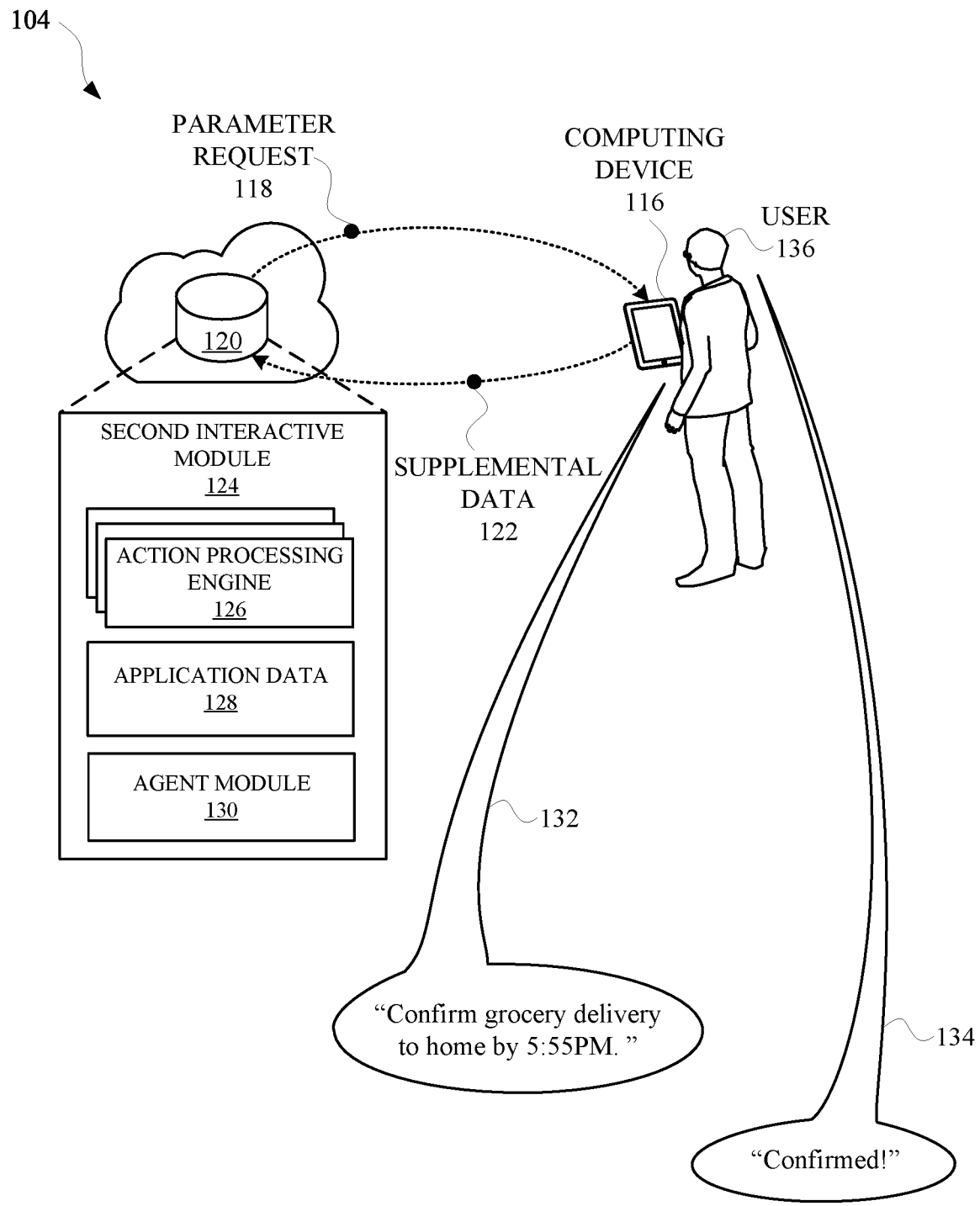

FIGS. 1A-1C illustrate examples of a user 136 interacting with an automated assistant capable of bypassing soliciting particular information from the user 136, when a separate interactive module is capable of providing the information. Specifically, FIG. 1A illustrate a view 100 of a user 136 invoking an automated assistant with a spoken utterance 108, in order to cause the automated assistant to access a first interactive module 114. The first interactive module 114 can be, for example, a grocery ordering application at which a user 136 can select from multiple selectable elements 112 corresponding to grocery items, which are presented at a graphical user interface 106 of a computing device 116. The spoken utterance 108 can be, for example, "Assistant, order groceries," which can cause the automated assistant to open the first interactive module 114, thereby allowing the user to select one or more of the selectable elements 112 for purposes of ordering particular grocery items.

In response to the user 136 selecting some of the selectable elements 112, as indicated in view 102 of FIG. 1B, the first interactive module 114 can provide a selectable suggestion of another action to be performed by a second interactive module 124, illustrated in view 104 of FIG. 1C. For instance, the first interactive module 114 can be provided by a first third-party developer and the second interactive module 124 can be provided by a second third-party developer that is different than the first third-party developer. In response to the user 136 selecting the selectable suggestion 138, the first interactive module 114 can pass supplemental data to the automated assistant and/or the second interactive module 124. The supplemental data can be generated in response to the user 136 selecting the selectable suggestion 138 and be provided in furtherance of the second interactive module 124 completing a second action corresponding to the selectable suggestion 138. For example, the selectable suggestion 138 can correspond to an action of ordering a third-party to pick up the selected items and deliver them to a home of the user 136. Therefore, instead of the user 136 providing a spoken utterance for invoking the automated assistant to initialize the second interactive module 124 for ordering the delivery, the user 136 can select the selectable suggestion 138 to cause the first interactive module 114 to interact with the automated assistant.

In response to the user 136 selecting the selectable suggestion 138, the first interactive module 114 can indicate to the automated assistant the action that the user is requesting and/or another interactive module capable of performing that action. The automated assistant can receive the indication, and determine a function that corresponds to the requested action, as well as any parameters needed to fulfill slot values of the function. When the automated assistant determines that one or more parameters are necessary for fulfilling slots of the function, the automated assistant can generate a request for the first interactive module 114 to provide the parameters. Additionally, or alternatively, the automated assistant can invoke the second interactive module 124 in response to the user selecting the selectable suggestion 138 and the second interactive module 124 can determine the parameters necessary to execute the function.

Specifically, FIG. 1C illustrates a view 104 of the second interactive module 124 causing a parameter request 118 to be provided to the computing device 116 and/or the automated assistant. The parameter request 118 can be provided by a remote device 120, such as a server, which hosts at least a portion of the second interactive module 124. The parameter request 118 can be provided to the computing device 116 and/or a separate remote device that hosts at least a portion of the automated assistant. In response to receiving the parameter request 118, the automated assistant can provide a request for the first interactive module 114 to provide one or more parameters corresponding to the parameter request 118. For instance, the second interactive module 124 can request a location and time for the ride to arrive, and in response to receiving the request, the automated assistant can generate a request for the first interactive module 114 to specify the location of the grocery items and the time they would be available. Additionally, or alternatively, the automated assistant can invoke the second interactive module 124 using a command that identifies the first interactive module 114 as a source of the initial suggestion. In response, the second interactive module 124 can provide the parameter request 118 to the first interactive module 114 in order to obtain the parameters from the first interactive module 114.

When the first interactive module 114 receives the request for the parameters from the second interactive module 124 and/or the automated assistant, the first interactive module 114 can respond with the parameters, which can be embodied as supplemental data 122. The supplemental data 122 can then be available to the second interactive module 124 as application data 128, and used to satisfy particular slots for executing the function corresponding to the selectable suggestion 138. In some implementations, an agent module 130 of the second interactive module 124 can interact with the automated assistant, using natural language or structured data, in order to obtain the supplemental data 122. For instance, the agent module 130 can initialize a dialog session with the automated assistant using a natural language input to the automated assistant, and the automated assistant can respond with a natural language output that identifies the parameters (e.g., "The items will be ready at 5:30 PM at the Grocery Store."). In this way, the user 136 would not need to repeat any additional information that was otherwise available from the first interactive module 114. In order words, the user 136 will have only need to click the selectable suggestion 138 in order to execute ordering the delivery, rather than participate in a dialog session with the automated assistant and/or another interactive module. Further, the user 136 may only optionally need to respond to a confirmation 132 from the automated assistant by providing a simple natural language input 134 (e.g., "Confirmed!").

Figure 2:
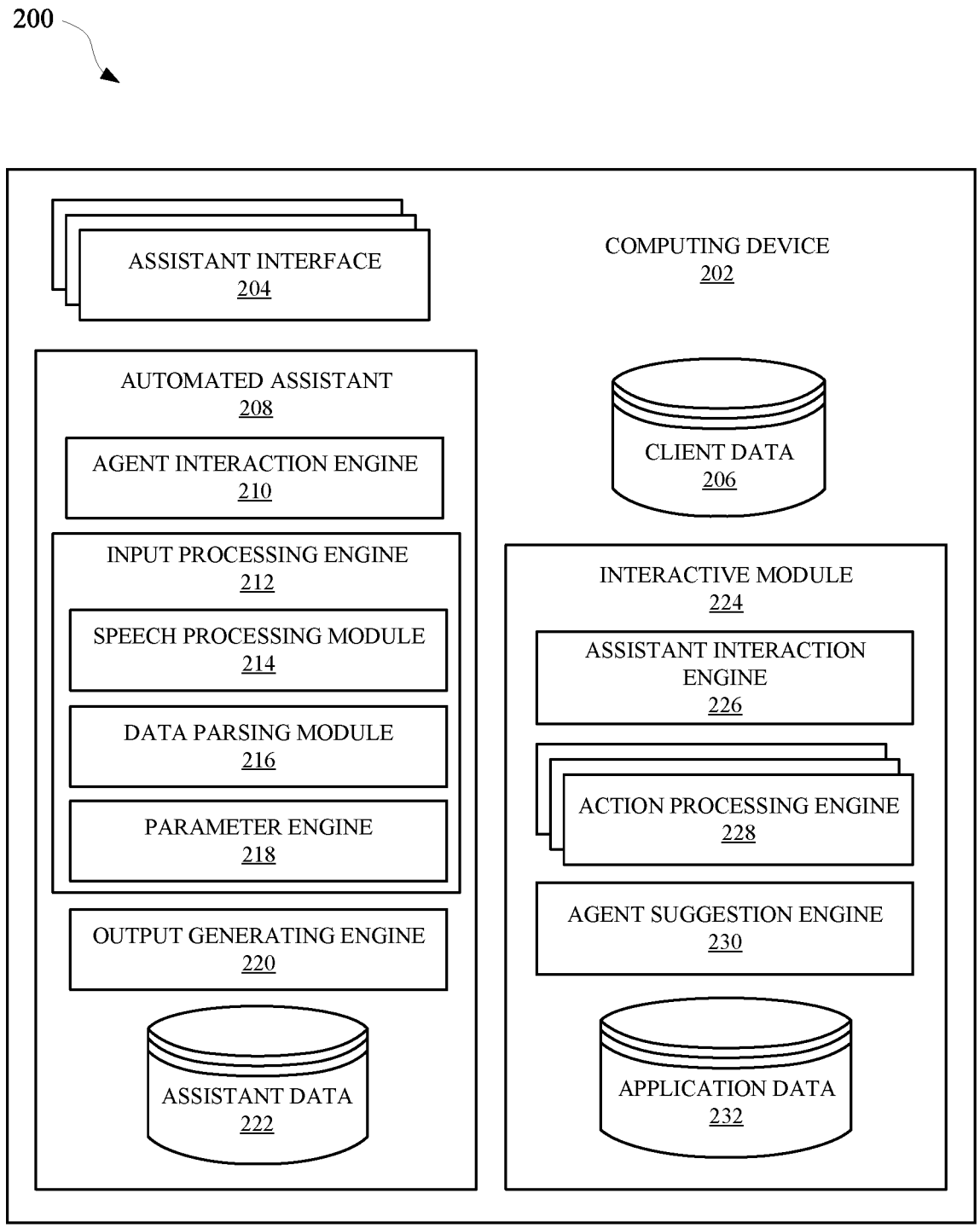
FIG. 2 illustrates a system for providing an automated assistant capable of bypassing soliciting a user for supplemental data for completing an action when a previously-queried application is capable of providing the supplemental data.

FIG. 2 illustrates a system 200 for providing an automated assistant 208 capable of bypassing soliciting a user for supplemental data for completing an action when a previously-queried application is capable of providing the supplemental data. The automated assistant 208 can operate as part of an automated assistant that is provided at one or more computing devices, such as a first client device (e.g., a cellular phone), a second client device (e.g., a standalone speaker device), and/or a remote computing device, such as a server device. A user can interact with the automated assistant 208 via one or more an assistant interfaces 204, which can include a microphone, a camera, a touch screen display, a user interface, and/or any other apparatus capable of providing an interface between a user and an application. For instance, a user can initialize the automated assistant 208 by providing a verbal, textual, and/or a graphical input to the assistant interface to cause the automated assistant 208 to perform a function (e.g., provide data, control a peripheral device, access an agent, etc.). A computing device 202 that provides at least a portion of the automated assistant 208 can include a display device, which can be a display panel that includes a touch interface for receiving touch inputs and/or gestures for allowing a user to control applications of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user.

The computing device 202 can be in communication with a remote computing device over a network, such as the internet. The computing device 202 can offload computational tasks to the remote computing device, such as speech processing tasks, in order to conserve computational resources at the computing device 202. For instance, in some implementations, the remote computing device can host the automated assistant 208, and the computing device 202 can transmit inputs received at one or more assistant interfaces 204 to the remote computing device. However, in some implementations, the automated assistant 208 can be hosted at the computing device 202. In various implementations, all or less than all aspects of the automated assistant 208 can be implemented on the computing device 202. In some of those implementations, aspects of the automated assistant 208 are implemented via a local automated assistant of the computing device 202 and interface with the remote computing device (e.g., a server device) that implements other aspects of the automated assistant 208. The remote computing device 120 can optionally serve a plurality of users and their associated automated assistants via multiple threads. In implementations where all or less than all aspects of the automated assistant 208 are implemented via a local automated assistant of the computing device 202, the local automated assistant can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the computing device 202 can include a speech processing module 214 that can process audio data received at an assistant interface to identify the text embodied in the audio data. The process for converting the audio data to text can include a speech recognition algorithm, which can employ neural networks, word2vec algorithms, and/or statistical models for identifying groups of audio data corresponding to words or phrases. The text converted from the audio data can parsed by a data parsing module 216 and made available to the automated assistant 208 as textual data that can be used to generate and/or identify command phrases from the user and/or an interactive module 224. The interactive module 224 can be a module that is separate from the automated assistant 208, and includes a corresponding application module and/or a corresponding agent module. An application module portion of the interactive module 224 can include a user interface with which the user can directly interface with the interactive module 224. Additionally, or alternatively, the agent module portion of the interactive module 224 can include an assistant interface with which the automated assistant 208 can act as an intermediary or broker between the user and the interactive module, and/or a another interactive module and the interactive module.

In some implementations, the automated assistant 208 has the ability to conduct dialog sessions between the user and the interactive module 224. For instance, a third party developer (e.g., a "third party" relative to an entity that developed the automated assistant 208) can create one or more entry points through which the automated assistant 208 can access the interactive module 224. The interactive module 224 can include an assistant interaction engine 226 for processing correspondence to and from the automated assistant 208. When a particular interaction between the automated assistant 208 and the interactive module 224 extends beyond a capability of the interactive module 224, the interactive module 224 can employ an agent suggestion engine 230 to suggest another interactive module and/or agent module for handling a particular requested action. Additionally, or alternatively, when the automated assistant 208 is requested to perform a task they may involve using information from a first interactive module, the automated assistant 208 can access the first interactive module 224, and/or application data 232 of the first interactive module 224 in order to obtain supplemental data.

As an example, the user can provide a request for a first action to be performed by providing a spoken utterance to an assistant interface 204 such as, "Assistant, order plane tickets for the vacation on my calendar." In response, audio data corresponding to the spoken utterance can be processed at the input processing engine 212. Specifically, the speech processing module 214 of the input processing engine 212 can convert the audio data into textual data and/or phoneme data, which can then be parsed by the data parsing module 216. The automated assistant 208 can use an output of the data parsing module 216 to determine the action that the user has requested to be performed. For instance, in some implementations an agent interaction engine 210 of the automated assistant 208 can be supplied the output from the data parsing module 216 in order to determine a suitable interactive module for performing at least a portion of the action.

The automated assistant 208 can transmit parsed data from the data parsing module 216 to the assistant interaction engine 226. Additionally, or alternatively, the automated assistant 208 can employ a parameter engine 218 for identifying parameters that may be necessary to fill one or more slots of a function corresponding to a first requested action. Thereafter, the automated assistant 208 can obtain any necessary parameters from the interactive module 224 to perform the action. Otherwise, the interactive module 224 can perform the action at the direction of the automated assistant 208.

For instance, the automated assistant 208 can provide the interactive module 224 with parsed data that is based on the spoken utterance, and the interactive module 224 can employ one or more action processing engines 228 for furthering completion of the action using the parsed data. Furthermore, the interactive module 224 can generate application data 232 in furtherance of completing the action. For example, in response to receiving parsed data corresponding to the action, such as "ordering plane tickets," the interactive module 224 can generate application data 232 that identifies a location of an airport and an estimated time of arrival, despite the user and/or the automated assistant 208 not explicitly requesting such data to be generated. Thereafter, a user can request that a second action be performed at the direction of the automated assistant 208, and in order for the second action to be completed, at least some of the generated application data 232 can be used as parameters for slots of a function corresponding to the second action.

As an example, the second action requested by the user can be a request for a ride to a nearby restaurant. Additionally, or alternatively, the second action can be requested by the user in response to the user selecting a suggestion generated by the interactive module 224. The user can request the ride to a nearby restaurant using a spoken utterance such as, "Assistant, I would also like to book a ride to the nearby Italian Restaurant." The automated assistant 208 can determine, using the input processing engine 212, that the second requested action corresponds to a function for "ordering a ride." The automated assistant 208 can query a parameter engine 218 of the input processing engine 212 to determine whether the automated assistant 208 has all the parameters for the slots of the corresponding function. When the automated assistant 208 does not have all the parameters available in its assistant data 222, the automated assistant 208 can identify an interactive module 224 that (i) most recently performed an action requested by the user, (ii) is currently opened, and/or (iii) the user has accessed within a threshold period of time from the user providing the second request.

According to the aforementioned example, the automated assistant 208 can initialize a dialog session with an agent module corresponding to the first interactive module 224, in order to obtain any remaining parameters needed to perform the function. For example, the automated assistant 208 can determine that a slot value for the function of "ordering a ride" requires a parameters value for a starting destination. In order to obtain the parameter, the automated assistant 208 can include an output generating engine 220 capable of generating a natural language output for interacting with the agent module and requesting the parameter. The natural language output can be, for example, "Agent, what is the location of the airport?" at least based on the automated assistant 208 identifying that the latest action, performed by the first interactive module 224, corresponding to ordering plane tickets. In response, the agent module of the first interactive module 224 can respond with a natural language output such as, "Louisville International Airport." The data parsing module 216 can parse the natural language output from the agent module and provide the resulting parsed data to the parameter engine 218 in order that the parameter engine 218 can, again, determine whether all parameters for the function corresponding to the second requested action have been filled.

When all the slots for the function corresponding to the second requested action have been filled, the automated assistant 208 can provide the parameters to a second interactive module, and optionally provide a request for the corresponding function to be performed. For example, the second interactive module can be a ride ordering application, and the parameters shared with the ride ordering application can be a starting destination parameter (e.g., "Louisville International Airport"), and/or a final destination parameter (e.g., "Italian Restaurant"). In this way, the user merely needed to request the second action be performed, and did not necessarily have to repeat any data that was already available from the first interactive module 224. This eliminates the need for the computing device 202 to process redundant data, thereby conserving processing bandwidth and memory at the computing device 202.

Figure 3A:
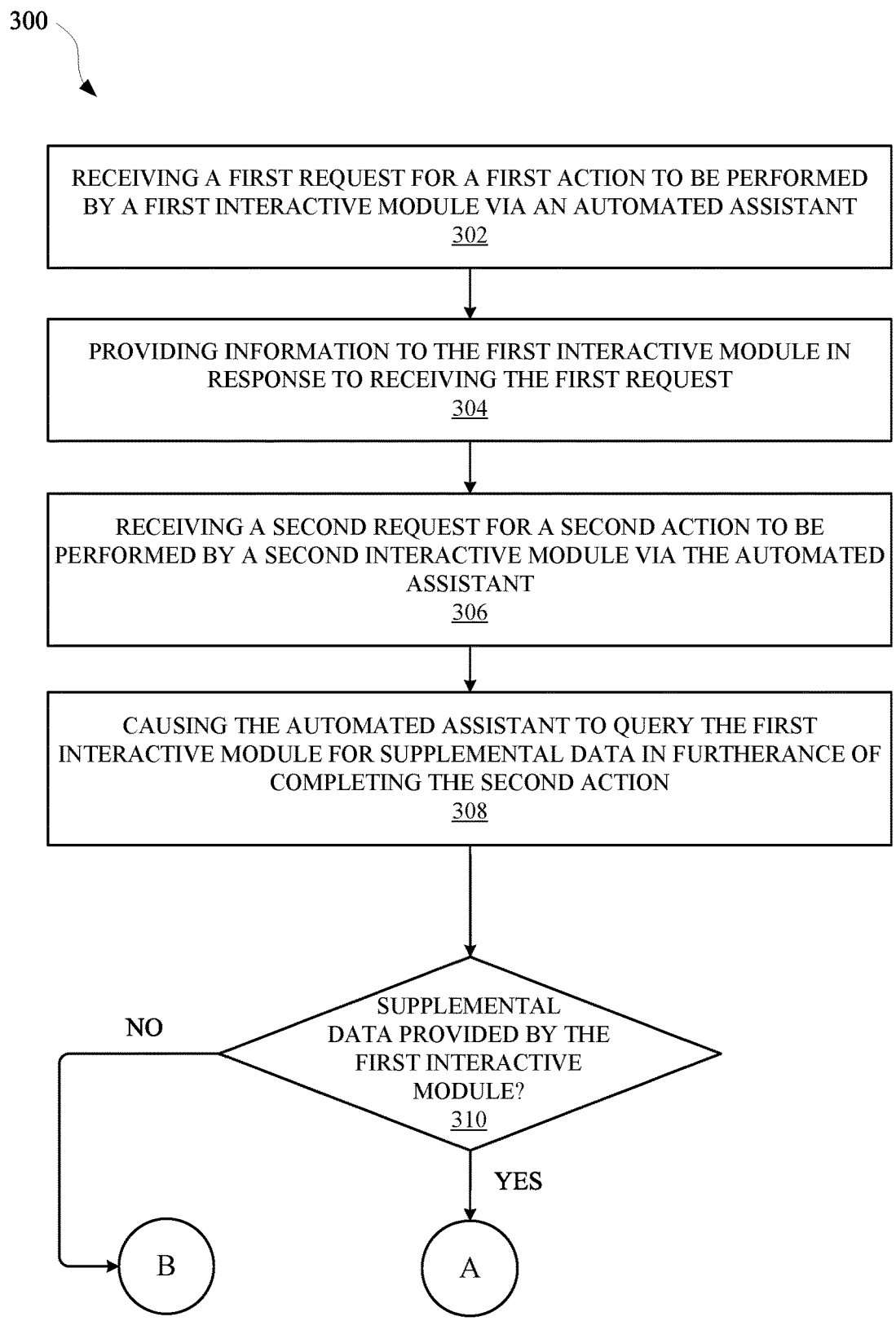
FIGS. 3A and 3B illustrate methods for invoking an interactive module to provide action-related data when a user is interacting with another interactive module, via an automated assistant, to perform a particular action.
Figure 3B:
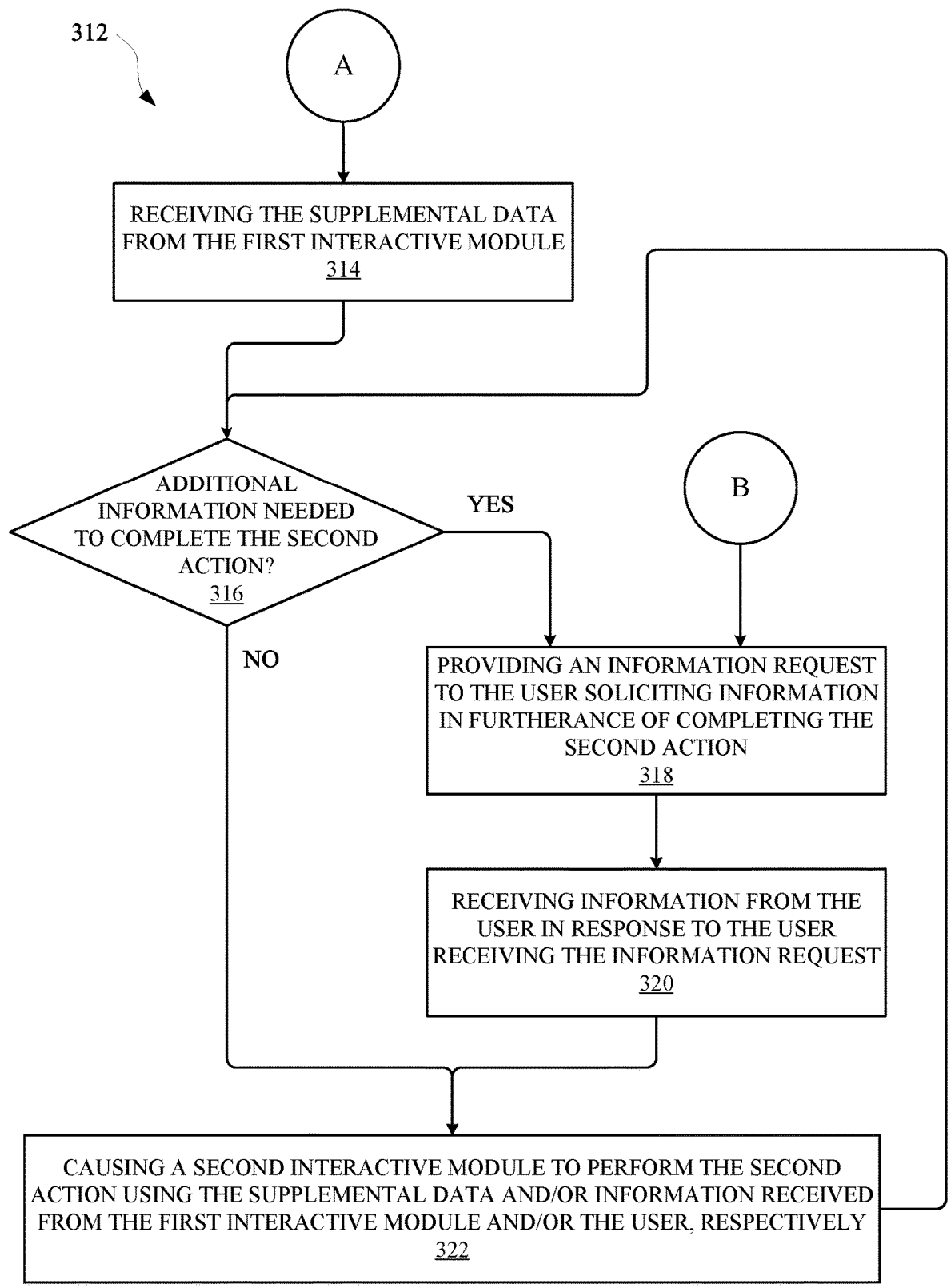

FIGS. 3A and 3B illustrate methods 300 and 312 for invoking an interactive module to provide action-related data when a user is interacting with another interactive module, via an automated assistant, to perform a particular action. Specifically, FIG. 3A provides a method 300 that is connect to method 312 by continuation elements "A" and "B," encircled in FIGS. 3A and 3B. The method 300 can include an operation of receiving a first request for a first action to be performed by a first interactive module via an automated assistant. For example, the user can provide a spoken utterance such as, "Assistant, buy movie tickets for the movie Pi tonight." In response, the automated assistant can identify a suitable interactive module through which the automated assistant can find times and locations for the identified movie, and purchase tickets for the identified movie.

The method 300 can further include an operation 304 of providing information to the first interactive module in response to receiving the first request. The information provided to the first interactive module can be based on content of the first request. For example, the first request can be received by an automated assistant interface of a computing device and can be processed by an input processing engine of the automated assistant. The input processing engine can convert the first request into text, which can be parsed into data that can be used to generate the information provided to the first interactive module. For example, the spoken utterance provided by the user can be received at the automated assistant interface and processed at an input processing engine. The input processing engine can include a speech processing module for converting the spoken utterance into another form of data, such as text and/or phonemes. The resulting data can then be parsed by a data parsing module of the automated assistant in order for particular data, such as the movie name "Pi" and the time of day "tonight," to be transmitted to the interactive module as at least part of the information. The information can then be received at an action processing engine of the interactive module.

The method 300 can also include an operation 306 of receiving a second request for a second action to be performed by a second interactive module via the automated assistant. The second request can also be received at the automated assistant interface as a spoken utterance such as, "Assistant, could you also make dinner reservations?" The second request can also be processed at the automated assistant in order to identify any data that can be used by the automated assistant to identify the second action (e.g., "make dinner reservations") and otherwise further completion of the second action. The automated assistant can identify the second action and determine, using a parameter engine, any parameters needed for the action to be completed. For example, an action of "making dinner reservations" can require parameters such as a time and place. In response to receiving the second request, the automated assistant can determine that the user did not provide a place parameter for the second action of "making dinner reservations." In order to cure this deficiency, the automated assistant can provide a supplemental data request to the first interactive module.

The method 300 can further include an operation 308 of causing the automated assistant to query the first interactive module for supplemental data in furtherance of completing the second action. Specifically, the automated assistant can provide the supplemental data request to the first interactive module in order that the first interactive module will provide supplemental data corresponding to the parameters needed to complete the second action. In some implementations, the automated assistant can communicate with the first interactive module via a dialog session characterized by exchanges of natural language between the automated assistant an agent module of the first interactive module. Additionally, or alternatively, the automated assistant can communicate with the first interactive module to retrieve structured data that is provided in a format that is not exclusively natural language (e.g., JSON). In some implementations, an interactive module can be preconfigured to have one or more entry points in which an automated assistant can access the interactive module in order to retrieve and/or request data from the interactive module. According to the aforementioned example, the automated assistant can request supplemental data corresponding to a "place" parameter for the second action, and the first interactive module can respond by providing supplemental data that identifies a relative location of a movie theater at which the first interactive module purchased movie tickets for the user. For instance, the automated assistant can provide a natural language input to the agent module of the automated assistant such as, "Agent, where is the movie theater located?" and in response, the agent module can respond with a natural language output such as, "Assistant, the location of the theater is the Highlands Neighborhood." It should be noted that the natural language output of the agent module can be generated by the agent module and not a recitation of input previously provided to the agent module. Rather, the agent module can generate any supplemental data that can be based on previous interactions between the user and the agent module, and/or the automated assistant and the agent module.

The method 300 can also include an operation 310 of determining whether supplemental data was provided by the first interactive module. When the first interactive module has provided the supplemental data, the method 300 can proceed to operation 314, as indicated by at least continuation element "A." When the first interactive module has not provided the supplemental data, the method 300 can proceed to operation 318, as indicated by at least continuation element "B."

The operation 314 can include receiving the supplemental data from the first agent module. The supplemental data can be received by the automated assistant and parsed at the data parsing engine of the automated assistant in order to identify any parameters suitable for furthering completion of the second action. When the automated assistant has successfully parsed the supplemental data from the first interactive module and identified any useful parameters, the automated assistant can determine whether any parameters are missing. For instance, the method 312 can also include an operation 316 of determining whether additional information is needed to complete the second action.

When additional information is needed to complete the second request, the method 312 can proceed to operation 318, which can include providing an information request to the user soliciting information in furtherance of completing the information second action. The information request can be provided to the user as a natural language output. For instance, when the second action requires a parameters indicating a "type of food," the natural language output can be, for example, "User, what type of food would you like to eat?" The natural language output can be provided from the automated assistant interface, which can be an audio system that includes one or more speakers and one or more microphones.

When the user has provided a response to the information request, the method 312 can include an operation 320 of receiving information from the user in response to the user receiving the information request. The additional information received from the user can be processed similar to the first request from the user. In other words, the natural language input corresponding to the additional information can be provided to a speech processing module of the automated assistant. An output of the speech processing module can then be provided to a data parsing engine in order to isolate particular portions of the natural language input in order to, for example, identify individual words or phrases provided in the natural language input. The data output by the data parsing engine can then be provided to a parameter engine for determining whether the natural language input included a parameter useful for furthering the second action. The automated assistant can then, again, determine at operation 316 whether any additional information is needed to complete the second action. When, at operation 316, the automated assistant determines that no additional information (e.g., one or more parameters or inputs) is needed in order to complete the second action, the method 312 can proceed to operation 322.

The operation 322 can include causing a second interactive module to perform the second action using the supplemental data and/or the information received from the first interactive module and/or the user, respectively. For instance, in some implementations, the second interactive module can rely on data exclusively from the first interactive module in order to complete the second action. However, in other implementations, the second interactive module can rely on the first interactive module and/or the user to obtain the parameters necessary for completing the second action. When the second interactive module is able to rely on the first interactive module for parameters, substantial computational resources and network resources can be preserved by not having to request that the user provide the parameters through a natural language input. Furthermore, when the automated assistant can bypass providing received natural language inputs to an external server for remote natural language processing, network bandwidth can be preserved for the computing device and any other device on a common network.

Figure 4A:
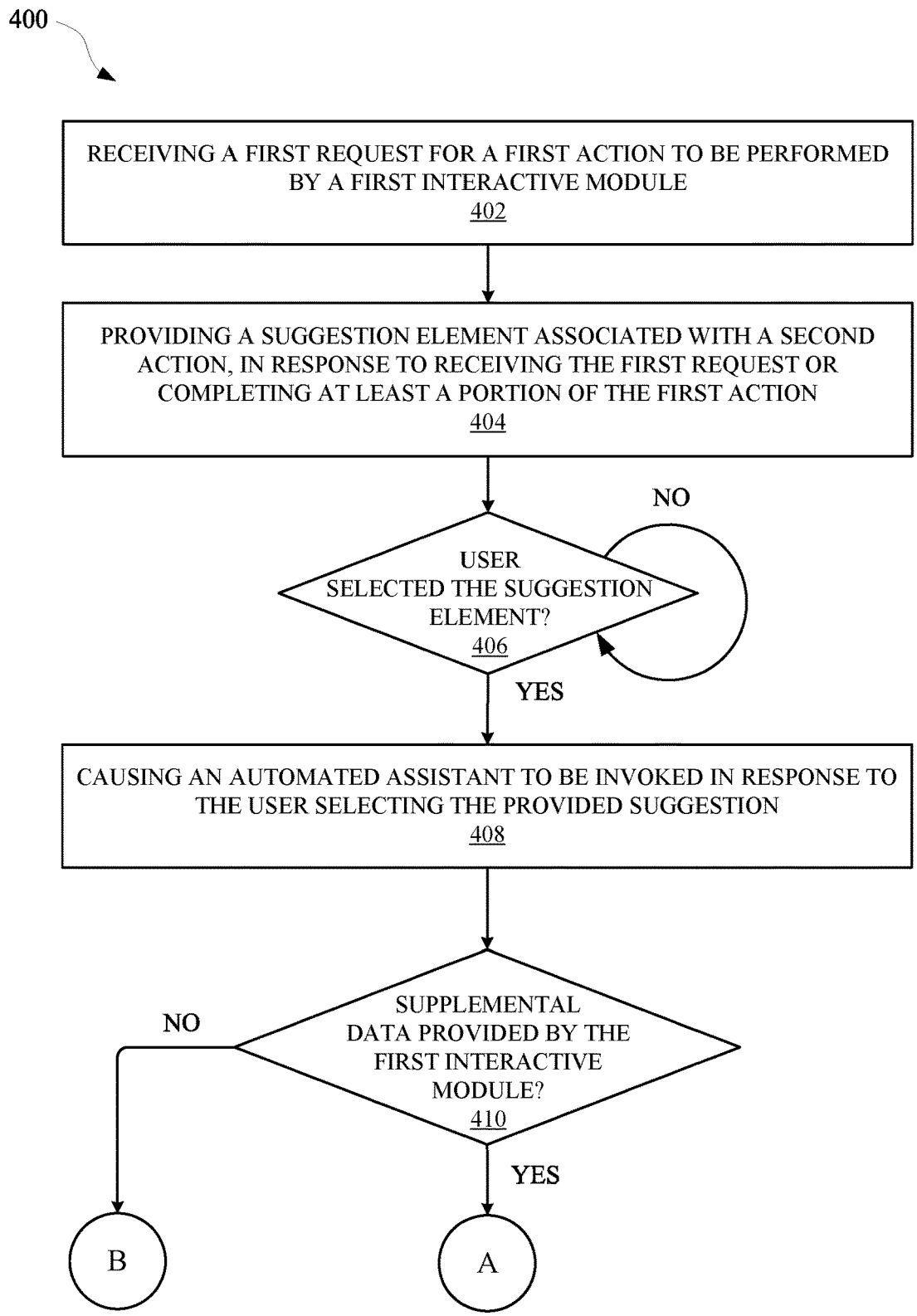
FIGS. 4A and 4B illustrate methods for invoking an interactive module, via an automated assistant, to provide action-related data when a user is interacting with another interactive module to perform a particular action.
Figure 4B:
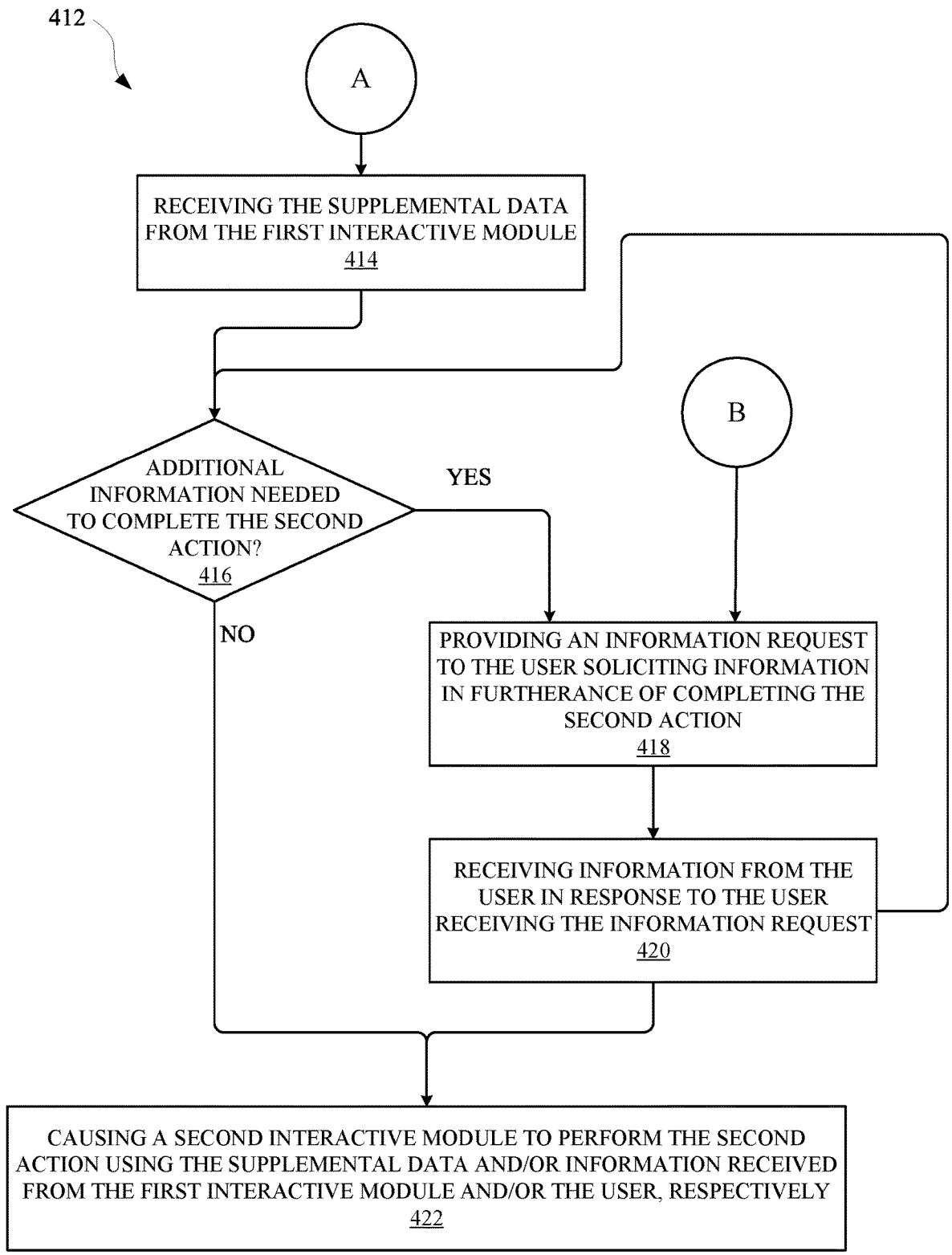

FIGS. 4A and 4B illustrate methods 400 and 412 for invoking an interactive module, via an automated assistant, to provide action-related data when a user is interacting with another interactive module to perform a particular action. Specifically, FIG. 4A provides a method 400 that is connect to method 412 by continuation elements "A" and "B," encircled in FIGS. 4A and 4B. The method 400 can include an operation 402 of receiving a first request for a first action to be performed by a first interactive module. The first request can be received by the first interactive module as an input to an interface that can include multiple different selectable graphical elements corresponding to particular functions capable of being performed by the first interactive module. For example, the first interactive module can operate to allow a user to order a ride to a particular destination. Furthermore, the first request from the user can correspond to a first action of booking a vehicle to pick up the user at their office and take the user to their home.

The method 400 can further include an operation 404 of providing a suggestion element associated with a second action, in response to receiving the first request or completing at least a portion of the first action. The suggestion element can a selectable graphical element that is provided with one or more selectable graphical elements provided at the interface of the first interactive module. In some implementations, the first interactive module can be configured to invoke an automated assistant and/or a second interactive module with a request to perform a second action and/or parameters for completing the second action. For example, the second action can be for ordering a food delivery to the home of the user, and a parameter that would be generated by the first interactive module and provided in response to the user selecting the selectable graphical element can be an "arrival time." In this way, a second interactive module and/or the automated assistant will not have to request the "arrival time" from the user in order to complete the second action, thereby conserving computational resources.

The method 400 can also include an operation 406 of determining whether the user selected the suggestion element. The first interactive module can determine whether the user selected the suggestion element by processing one or more inputs of one or more interfaces of a computing device at which the first interactive module is operating. For example, the user can use an appendage to tap a graphical user interface of the first interactive module in order to select the suggestion element. Additionally, or alternatively, the user can provide a spoken utterance to an audio interface of the computing device in order to select the suggestion element. For example, the selectable suggestion element can graphically display the text, "Order a food delivery," which can put the user on notice that, when the user speaks the text, the first interactive module will invoke the automated assistant to assist with ordering a food delivery.

The method 400 can further include an operation 408 of causing an automated assistant to be invoked in response to the user selecting the provided suggestion element. For instance, the first interactive module can include an assistant interaction engine that can process a selection from the user and generate a request to the automated assistant in response. The request for the automated assistant can identify one more parameters that the automated assistant can use in order to further the second action that the user selected to be performed. In some implementations, the first interactive module can include an action processing engine capable of determining the parameters needed to complete a particular action, and determine whether the first interactive module is capable of generating or otherwise providing the parameters. Additionally, or alternatively, the automated assistant can receive a request from the first interactive module and determine from the request whether the automated assistant has the parameters needed to complete the requested action.

The method 400 can also include an operation 410 of determining whether the supplemental data (e.g., action parameters) was provided by the first interactive module. When the supplemental data is provided by the first interactive module, the method 400 can proceed to operation 414, as indicated by at least continuation element "A." When the supplemental data is not provided by the first interactive module, the method 400 can proceed to operation 418, as indicated by at least continuation element "B."

The operation 414 can include receiving the supplemental data from the first interactive module. The supplemental data can include one or more parameters that can be used by a second interactive module for completing the second action requested by the user. For example, the supplemental data can include the "arrival time," thereby allowing the automated assistant to bypass requesting the user to speak or otherwise input the arrival time. Furthermore, the first interactive module can oftentimes provide a more accurate estimate of particular variables, given that the first interactive module can have access to traffic data, vehicle data, historical travel times, and/or any other data capable of being used when determining arrival time. Furthermore, once the user has selected to have the second action performed, the first interactive module can repeatedly determine updates for any parameters provided to the automated assistant and/or the second interactive module. For example, if an estimated "arrival time" for the user to their home changes, the first interactive module can update the automated assistant and/or the second interactive module in order that the food delivery will arrive on or after a time when the user arrives home.

The method 412 can further include an operation 416 of determining whether additional information is needed to complete the second action. When additional information is needed to complete the second action, the method 412 can proceed to operation 418. When additional information is not needed to complete the second action, the method 412 can proceed to operation 422. The automated assistant can determine whether additional information is needed to complete the action using a parameter engine of the automated assistant. The parameter engine can identify the second action to be performed and, based on the identified second action, identify one or more slots necessary to be filled in order to perform the second action. Additionally, or alternatively, the automated assistant can determine the second action to be perform, query an agent interaction engine to determine a suitable agent module that can perform the second action, and then query the determined agent module to identify any additional slots that need to be filled to complete the second action. The automated assistant can then determine whether the automated assistant currently has suitable parameters for the additional slots, or whether the suitable parameters should be retrieved from the first interactive module and/or the user.

The operation 418 can include providing an information request to the user, or a different interactive module, in furtherance of completing the second action. For instance, the information request provided to the user can correspond to a request for the user to specify a type of food to be delivered to the home of the user. The information request can be based on an output of the parameter engine and the output generating engine of the automated assistant, and can be embodied as a natural language output such as, "What type of food would you like?" In this way, the user can be put on notice that at least one more slot of a function for ordering a food delivery needs to be filled with a parameter (e.g., a specified food type) in order for the function to be executed.

The method 412 can further include an operation 420 of receiving information from the user in response to the user receiving the information request. The information from the user can be, for example, embodied in a spoken utterance such as, "I would like Middle Eastern food." The spoken utterance can be processed by a speech processing module and a data parsing engine of the automated assistant in order to identify the parameter specified by the user for the slot of the function corresponding to the second action. The available parameters, provided by the first interactive module and/or the user, can be provided to the second interactive module in order that the second interactive module can execute the second action of ordering the food delivery.

The operation 422 can include causing the second interactive module to perform the second action using the supplemental data and/or information received from the first interactive module and/or the user, respectively. For instance, when the first interactive module has provided the estimated "arrival time" and the user has provided the specified type of food as "Middle Eastern," the automated assistant can cause the second interactive module to perform the second action using the aforementioned parameters. Alternatively, when the only parameter needed is the "arrival time," the automated assistant can cause the second interactive module to perform the second action by at least providing the parameters (e.g., estimated arrival time) to the second interactive module. In this way, the second action can be performed without any further speech processing beyond the initial request for the second action to be performed, thereby conserving computational resources at any computing device tasked with assisting the automated assistant. Furthermore, the second action can be initialized sooner, given that a dialog session between the user and automated assistant for obtaining additional parameters may take longer than the first interactive module providing the parameters to the automated assistant and/or the second interactive module.

Figure 5:
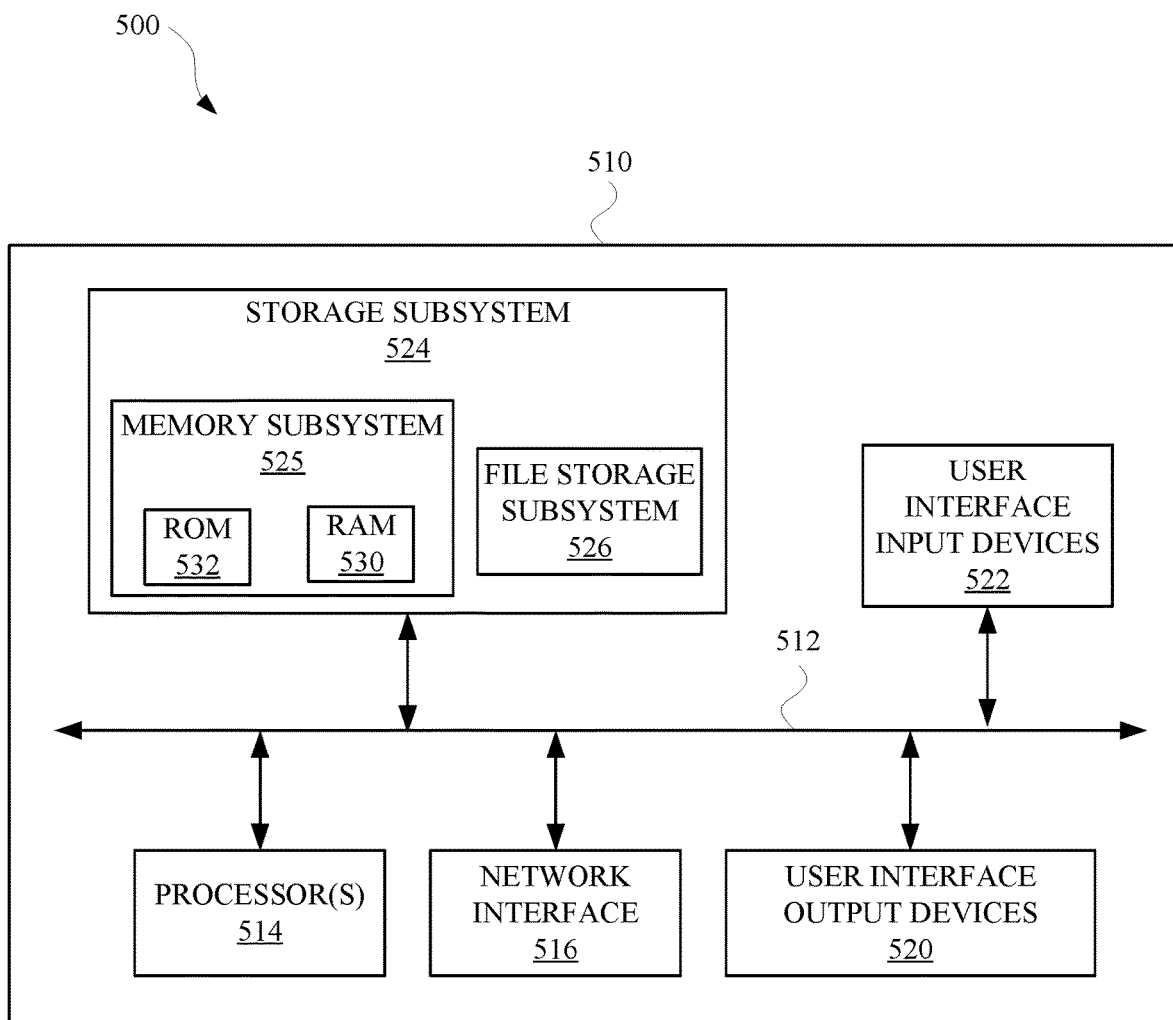
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 1124 may include the logic to perform selected aspects of method 300, 312, 400, 412, and/or to implement one or more of first interactive module 114, second interactive module 124, computing device 116, computing device 202, automated assistant 208, interactive module 224, agent interaction engine 210, input processing engine 212, speech processing module 214, data parsing module 216, parameter engine 218, output generating engine 220, assistant interaction engine 226, action processing engine 228, and/or agent suggestion engine 230.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
receiving, via an automated assistant and from a user, a first request to perform a first action, wherein the first request is received at an automated assistant interface of a computing device and the first request includes information with which a first interactive module is to perform the first action;
causing the automated assistant to invoke and provide the first interactive module with the information in order for the first interactive module to complete at least a portion of the first action using the information and to thereby generate supplemental data which includes data that indicates a context associated with the first request or first action;
causing the first interactive module to complete the portion of the first action, wherein a selectable suggestion is rendered via the first interactive module to suggest a second action to be performed by a second interactive module, wherein the second interactive module is different from the first interactive module, and wherein the second action is different from the first action;
receiving, via the automated assistant and from the user, a second request to perform the second action, wherein the second request selects the selectable suggestion rendered at an interface of the first interactive module;
determining that the first and second requests are void of content to fill a slot of a function corresponding to the second action;
providing, in response to determining that the first and second requests are void of the content to fill the slot of the function corresponding to the second action, a supplemental data request to the first interactive module for the supplemental data;

receiving, from the first interactive module, the supplemental data in response to the first interactive module receiving the supplemental data request; and causing, in response to receiving the supplemental data, the automated assistant to access the second interactive module, wherein accessing the second interactive module includes providing at least the supplemental data to the second interactive module in order for the second interactive module to perform the second action using the supplemental data.

2. The method of claim 1, wherein the supplemental data from the first interactive module is received by the automated assistant as a natural language input, which is provided in a same language as the first request from the user to the automated assistant interface.

3. The method of claim 2, wherein causing the automated assistant to access the second interactive module includes identifying the second interactive module from multiple different interactive modules based on one or more of: whether the received supplemental data is correlated with the second interactive module, whether the second interactive module is currently opened at the computing device, or whether the user has previously selected the second interactive module to perform the second action.

4. The method of claim 1, further comprising:
determining that the first action is associated with the second request based on one or more of: whether the first interactive module is currently opened at the computing device or whether the user has accessed the first interactive module within a threshold period of time from the user providing the second request,
wherein the supplemental data request is provided to the first interactive module in response to determining that the first action is associated with the second request.

5. The method of claim 1, further comprising:
determining that the first action is associated with the second request by determining that some natural language embodied in the first request is the same as other natural language embodied in the second request,
wherein the supplemental data request is provided to the first interactive module in response to determining that the first action is associated with the second request.

6. The method of claim 1, wherein the supplemental data includes at least some supplemental information explicitly omitted from any natural language content embodied by the first request and the second request.

7. The method of claim 1, wherein causing the automated assistant to access the second interactive module includes determining, for multiple interactive modules accessible to the computing device, a score for each interactive module of the multiple interactive modules based on a relevance of each interactive module to a natural language content of the second request or another relevance of each interactive module to the supplemental data.

8. A method implemented by one or more processors, the method comprising:
determining that a first request for a first action to be performed by a first interactive module was received by a computing device from a user, wherein the first interactive module is accessible to an automated assistant, which is configured to be responsive to natural language input from the user;
causing, in response to determining that the first request was received by the computing device, the first interactive module to initialize performance of the first action using information included in the first request that is accessible to the first interactive module and to thereby generate supplemental data;
causing, subsequent to initializing the performance of the first action but prior to the completing of the first action, the first interactive module to render, simultaneously and via an interface of the first interactive module and for selection by the user, a first selectable element to continue the performance of the first action and a second selectable element to perform a second action by a second interactive module that is different from the first interactive module;
determining, subsequent to causing the first interactive module to render the first and second selectable elements, that the computing device received a second request for the second action to be performed, the second request comprising a selection of the second selectable element;
determining that the first and second requests are void of content to fill a slot of a function corresponding to the second action;
providing, in response to determining that the first and second requests are void of the content to fill the slot of the function corresponding to the second action, the supplemental data request configured to solicit the first interactive module for supplemental data in furtherance of completing the second action;
receiving, from the first interactive module in response to providing the supplemental data request to the first interactive module, the supplemental data;
providing, in response to receiving the supplemental data from the first interactive module, other information to the second interactive module, wherein the other information includes content that is at least partially based on the supplemental data and is provided to the second interactive module in furtherance of completion of the second action; and
causing user interface output to be rendered at the computing device, wherein the user interface output is based on output provided by the second interactive module, and wherein the second interactive module generates the output based at least in part on the supplemental data provided to the second interactive model.

9. The method of claim 8, further comprising:
causing, at least based on the first request, a selectable suggestion output to be provided at the computing device, the selectable suggestion identifying the second action or the second request; and
identifying, from multiple interactive modules accessible to the computing device, the second interactive module based on a relevance of the second interactive module to content of the second request,
wherein the supplemental data request is based on a slot of a function associated with the second interactive module, and wherein the supplemental data request at least partially embodies natural language content.

10. The method of claim 8, wherein the supplemental data received from the first interactive module includes the content for the slot of the function, and the other information provided to the second interactive module includes the content for the slot of the function.

11. The method of claim 10, further comprising:
generating the other information for providing to the second interactive module using the content for the slot of the function from the supplemental data and additional content derived from the first request or the second request for a different slot of the function.

12. The method of claim 10, further comprising:
determining that the first request, the second request, and the supplemental data are void of another parameter for another slot of the function; and
generating a natural language output for the user from the automated assistant, wherein the natural language output solicits the user to provide the other parameter for the other slot of the function; and
receiving, by the automated assistant and from the user, a natural language response that embodies the other parameter for the other slot of the function,
wherein the other information provided to the second interactive module embodies the other parameter.

13. A method implemented by one or more processors, the method comprising:
receiving, by an automated assistant and from a user, a first request for a first action to be performed, wherein the automated assistant selects, based on the first request, a first interactive module that is accessible to the automated assistant at a computing device, and the first interactive module is configured to be responsive to natural language input from the user and the automated assistant;
providing, in response to receiving the first request and in furtherance of completing the first action, the first interactive module with information embodied by the first request from the user;
receiving, by the automated assistant via an interface of the first interactive module and from the user, a second request for a second action, wherein the second action is performed by one or more interactive modules different from the first interactive module;
determining that the first and second requests are void of content to fill a slot of a function corresponding to the second action;
causing, in response to determining that the first and second requests are void of the content to fill the slot of the function corresponding to the second action, the automated assistant to participate in an interaction between the automated assistant and the first interactive module to solicit the first interactive module for supplemental data having the content that fills the slot in furtherance of completing the second action;
when the supplemental data is provided by the first interactive module during the interaction between the automated assistant and the first interactive module:
receiving the supplemental data from the first interactive module;
when the first interactive module is presently unable to provide the supplemental data at least in furtherance of completing the second action:
providing an information request to the user soliciting information in furtherance of completing the second action, and
receiving information from the user in response to the user receiving the information request;
providing, in response to receiving the supplemental data from the first interactive module or the information from the user, an input to the one or more interactive modules, wherein the input is at least partially based on the supplemental data or the information, and is provided in furtherance of completing the second action.

14. The method of claim 13, wherein the interaction between the automated assistant and the first interactive module is a natural language dialog session comprising at least one natural language output provided by each of the automated assistant and the first interactive module.

15. The method of claim 13, wherein the supplemental data or the information includes at least some supplemental information explicitly omitted from any natural language content embodied by the first request and the second request.

16. The method of claim 13, further comprising:
identifying, in response to receiving the second request, the function capable of being performed by one or more of the interactive modules in furtherance of performing the second action.

17. The method of claim 16, wherein determining that the first request and the second request are void of the content for the slot of the function includes comparing contents of the first request and the second request to one or more slots of the function.

18. The method of claim 13, further comprising:
causing, in response to receiving the second request, a graphical user interface of the computing device to provide one or more selectable suggestion elements identifying the one or more interactive modules, respectively, as capable of furthering completion of the second action, wherein the input is provided to a second interactive module further in response to the user selecting a selectable suggestion element of the one or more selectable suggestion elements.

19. The method of claim 18, wherein providing the first interactive module with information embodied by the first request from the user includes causing a separate graphical user interface to present a separate selectable suggestion element and an indication to the user, wherein the separate selectable suggestion element corresponds to the first interactive module, and the indication corresponds to the automated assistant.

* * * * *